United States Patent
Takasugi et al.

(10) Patent No.: US 8,772,444 B2
(45) Date of Patent: Jul. 8, 2014

(54) METHOD FOR PRODUCING PETROLEUM RESIN

(75) Inventors: Hajime Takasugi, Shunan (JP); Katsumi Furuta, Shunan (JP); Kazunori Saeki, Shunan (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/808,421

(22) PCT Filed: Jul. 7, 2011

(86) PCT No.: PCT/JP2011/003898
§ 371 (c)(1),
(2), (4) Date: Jan. 4, 2013

(87) PCT Pub. No.: WO2012/005002
PCT Pub. Date: Jan. 12, 2012

(65) Prior Publication Data
US 2013/0109814 A1    May 2, 2013

(30) Foreign Application Priority Data
Jul. 8, 2010  (JP) ................................. 2010-155760

(51) Int. Cl.
*C08G 64/00*   (2006.01)
*C08G 63/02*   (2006.01)

(52) U.S. Cl.
USPC ...................................... 528/502 R; 528/338

(58) Field of Classification Search
USPC ............................................... 528/338, 502
See application file for complete search history.

(56) References Cited

U.S. PATENT DOCUMENTS

| | | | |
|---|---|---|---|
| 5,569,315 A | 10/1996 | Konig et al. | |
| 6,261,979 B1 | 7/2001 | Tanaka et al. | |
| 6,331,245 B1 | 12/2001 | Moretta et al. | |
| 7,700,683 B2 | 4/2010 | Seo et al. | |
| 2006/0063892 A1 | 3/2006 | Yamane | |
| 2006/0223948 A1 | 10/2006 | Yamane | |
| 2009/0111914 A1 | 4/2009 | Seo et al. | |
| 2011/0159765 A1 | 6/2011 | Fukasawa et al. | |

FOREIGN PATENT DOCUMENTS

| | | |
|---|---|---|
| CN | 1648161 A | 8/2005 |
| CN | 1720272 A | 1/2006 |
| CN | 1726231 A | 1/2006 |
| GB | 2017774 | * 10/1979 |
| JP | 2000 25095 | 1/2000 |
| JP | 2002 346363 | 12/2002 |
| WO | 98 26860 | 6/1998 |
| WO | WO 2007/060241 | 5/2007 |
| WO | WO 2010/055668 | 5/2010 |

OTHER PUBLICATIONS

Zoryu Handbook, Ohmsha, Ltd., Total 4 pages, (Mar. 10, 1991).
International Search Report Issued Oct. 4, 2011 in PCT/JP11/03898 Filed Jul. 7, 2011.
Office Action issued Jan. 20, 2014, in Chinese Patent Application No. 201180033833.2.
European Search Report issued Mar. 31, 2014 in corresponding European Patent Application No. 11 80 3339.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A method for producing a petroleum resin including removing a low-molecular mist by means of a filter.

16 Claims, 5 Drawing Sheets

METHOD FOR PRODUCING PETROLEUM RESIN

This application is a 371 of PCT/JP2011/003898 filed Jul. 7, 2011. Priority to Japanese patent application 2010-155760, filed Jul. 8, 2010, is claimed.

TECHNICAL FIELD

The invention relates to a method for producing a petroleum resin. More particularly, the invention relates to a method for producing a petroleum resin capable of suppressing environmental hazard.

BACKGROUND ART

A petroleum resin allows a low-molecular compound which is a highly-viscous fine particle such as an oligomer to be generated in a polymer in its polymerization system as an impurity. The low-molecular compound is separated and generated as a low-molecular mist in a granulation system, in particular.

For example, a hydrogenated petroleum resin is produced by a process in which polymerization is conducted in a polymerization system, followed by removal of unsaturated matters in the resin in a hydrogenation reaction system. At this time, for a resin from which unsaturated matters are removed, a solvent and a low-molecular compound are removed by a thin film evaporator. In the molten state, the resin is sent to a granulation system as a final process to become a hydrogenated petroleum resin pellet.

The above-mentioned molten hydrogenated petroleum resin contains a trace amount of a low-molecular compound which cannot be separated by a thin film evaporator. In the hydrogenated molten petroleum resin containing the low-molecular compound, at the time of dropwise addition thereof to a steel belt at the time of granulation, as for the low-molecular compound, a smoke-like mist is generated from the surface of the resin. This mist is sucked together with cooling air by means of a blower, and then discharged to the outside from an exhaustion port through an exhaustion duct, thereby imposing environmental load.

SUMMARY OF THE INVENTION

An object of the invention is to provide a method for producing a petroleum resin capable of suppressing environmental hazard.

According to the invention, the following method for producing a petroleum resin is provided.
1. A method for producing a petroleum resin comprising removing a low-molecular mist by means of a filter.
2. A method for producing a hydrogenated petroleum resin comprising the steps of:
   polymerizing a cyclopentadiene-based compound and an aromatic vinyl compound to obtain a polymer;
   hydrogenating the polymer to prepare a molten hydrogenated petroleum resin; and
   granulating the molten hydrogenated petroleum resin to obtain hydrogenated petroleum resin pellets,
   wherein a suction path having a filter is provided in a granulator, and the low-molecular mist generated from the molten hydrogenated petroleum resin is sucked through the suction path, and the low-molecular mist is removed by means of the filter.
3. The method for producing a hydrogenated petroleum resin according to 2, wherein the filter is a glass fiber layer filter.
4. The method for producing a hydrogenated petroleum resin according to 2 or 3, wherein the granulator is a roll-drop type granulator in which the molten hydrogenated petroleum resin is added dropwise to a steel belt, and the suction path is provided at any position of the steel belt where the molten hydrogenated petroleum resin is not solidified.

According to the invention, a method for producing a petroleum resin capable of suppressing environmental load can be provided.

MODE FOR CARRYING OUT THE INVENTION

Figure 1:
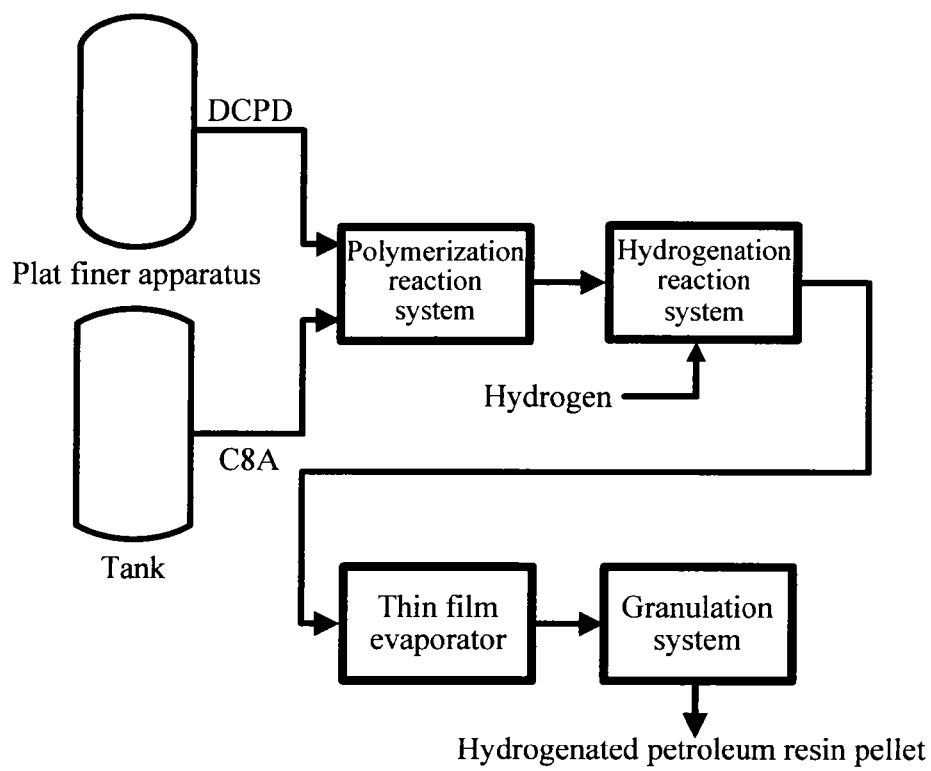
FIG. 1 is a schematic flow of an apparatus for producing a hydrogenated petroleum resin when dicyclopentadiene and C8 aroma are used.

A petroleum resin generates a low-molecular compound in a polymer in a polymerization system. The low-molecular compound may be separated from a petroleum resin in the form of a smoke mist.

In the method for producing a petroleum resin of the invention, a suction means having a filter is provided in the polymerization reaction system and/or a granulation system of a petroleum resin, for example, and a low-molecular mist is removed by means of this filter.

As the above-mentioned petroleum resin, a polymer obtained by polymerizing an aliphatic compound and/or an aromatic compound collected from petroleum fractions can be given. Further, the petroleum resins include copolymers, hydrogenated polymers or the like. Specific examples thereof include Arcon (manufactured by Arakawa Chemical Industries, Ltd.), Hilets (manufactured by Mitsui Chemicals, Inc.), Quintone (manufactured by Zeon Corporation) and Escorez (manufactured by Tonex, Corp).

Of these petroleum resins, a hydrogenated petroleum resin obtained by a process in which a cyclopentadiene-based compound and an aromatic vinyl compound are polymerized, and the resulting polymer is hydrogenated is preferable in respect of effective application of the production method of the invention.

Hereinbelow, an explanation will be made on a case where the petroleum resin is a hydrogenated petroleum resin obtained by polymerizing a cyclopentadiene-based compound and an aromatic vinyl compound.

A hydrogenated petroleum resin can be produced by a process in which a cyclopentadiene-based compound and an aromatic vinyl compound are polymerized and the resulting polymer is hydrogenated.

As the cyclopentadiene-based compound, cyclopentadiene, methylcyclopentadiene, ethylcyclopentadiene, a dimer thereof, a co-dimer thereof or the like can be given.

As the aromatic vinyl compound, styrene, α-methylstyrene, vinyltoluene or the like can be given, for example.

The mixing ratio of the cyclopentadiene-based compound and the aromatic vinyl compound is not particularly restricted. Normally, the cyclopentadiene-based compound: aromatic vinyl compound (mass ratio)=70:30 to 20:80, preferably 60:40 to 40:60.

Polymerization of the cyclopentadiene-based compound and the aromatic vinyl compound is a thermal polymerization in a solvent, for example.

Usable polymerization solvents include an aromatic-based solvent, a naphthene-based solvent, an aliphatic hydrocarbon-based solvent, or the like. For example, benzene, toluene, xylene, cyclohexane, dimethylcyclohexane, ethylcyclohexane or the like can be preferably used.

The amount of the polymerization solvent is normally 50 to 500 parts by mass, preferably 60 to 300 parts by mass, relative to 100 parts by mass of the monomer mixture.

It is desirable that the solvent be heated at 100° C., preferably 150° C. or higher, at the time of starting the polymerization reaction. It is preferable to conduct copolymerization while adding to the heated solvent in a divided manner a mixture of a cyclopentadiene-based compound and an aromatic vinyl compound.

The time of the divided addition is normally 0.5 to 5 hours, preferably 1 to 3 hours. It is desired that it be added in an equal amount.

It is desirable that the polymerization reaction be continued after the divided addition of the mixture of the cyclopentadiene-based compound and the aromatic vinyl compound is completed. No specific restrictions are imposed on the polymerization conditions. However, normally, the reaction temperature is 150 to 350° C., preferably 220 to 300° C., the reaction pressure is 0 to 2 MPa, preferably 0 to 1.5 MPa, and the reaction time is 1 to 10 hours, preferably 1 to 8 hours.

The resulting reaction liquid is treated at a temperature of 100 to 300° C., at a pressure of 100 to 1 mmHg for 1 to 3 hours. Then, the thus treated reaction liquid is subjected to desolventizing to remove volatile matters (in addition to the solvent, the low-molecular compound can also be evaporated), whereby a copolymer can be obtained.

The copolymer of the cyclopentadiene-based compound and the aromatic vinyl compound is a copolymer having a softening point of 50 to 120° C., an aromatic vinyl compound unit content of 30 to 90 mass %, an bromine number of 30 to 90 g/100 g and a number average molecular weight of 400 to 1100.

By subjecting the above-mentioned copolymer to a hydrogenation reaction, a hydrogenated petroleum resin is produced.

The hydrogenation reaction is conducted in the presence of a nickel-, palladium-, cobalt-, platinum- or rhodium-based catalyst after dissolving the copolymer in a solvent such as cyclohexane and tetrahydrofurane.

The reaction temperature is normally 120 to 300° C., preferably 150 to 250° C. The reaction pressure is 1 to 6 MPa, for example. The reaction time is normally 1 to 7 hours, preferably 2 to 5 hours.

By treating the hydrogenated reaction mixture liquid, for example, at a temperature of 100 to 300° C., a pressure of 100 to 1 mmHg for 10 minutes to 3 hours to remove volatile matters (in addition to the solvent, the low-molecular compound can also be evaporated), a hydrogenated petroleum resin can be obtained.

The hydrogenated petroleum resin obtained by the hydrogenation reaction is in the molten state. By granulating the molten hydrogenated petroleum resin, a pellet as a final product is obtained.

In the method for producing a hydrogenated petroleum resin of the invention, a sucking path having a filter is provided in a granulator which granulates the molten hydrogenated petroleum resin, and through the sucking path, a low-molecular mist generated from the molten hydrogenated petroleum resin is sucked up, and the low-molecular mist is removed by means of a filter.

FIG. 1 shows a schematic flow of an apparatus for producing a hydrogenated petroleum resin when dicyclopentadiene and C8 aroma as a styrene monomer is used.

As shown in FIG. 1, dicyclopentadiene (DCPD) is supplied to a polymerization reaction system from a plat finer apparatus and C8 aroma (C8A) is supplied from a tank to a polymerization reaction system. In the polymerization system, thermal polymerization is conducted. A petroleum resin obtained by the thermal polymerization is reacted with hydrogen in a hydrogenation reaction system, whereby a hydrogenated petroleum resin is obtained. The hydrogenated petroleum resin is in the molten state. A solvent and a low-molecular compound are separated by a thin film evaporator from the molten hydrogenated petroleum resin, and the resin is then supplied to a granulation system, whereby a pellet is obtained.

The molten hydrogenated petroleum resin contains a trace amount of a low-molecular compound which cannot be separated by a thin film evaporator. When dropwise addition to a steel belt is conducted at the time of granulation, from the surface of the molten hydrogenated petroleum resin, the low-molecular compound is generated in the form of a mist from the surface thereof. Generation of the low-molecular mist continues until the temperature of the molten hydrogenated petroleum resin is decreased to a temperature equal to or lower than the softening point at which the molten hydrogenated petroleum resin is solidified.

In the invention, a sucking path having a filter for removing the low-molecular mist is provided in the granulation system, whereby the low-molecular mist as an environmental load substance is removed and collected. As a result, suppression of environmental hazard becomes possible. Further, the collected low-molecular mist can be re-used as a raw material for fuel oil. The method for producing a hydrogenated petroleum resin of the invention can be effective for reusing of waste.

The position at which the suction path having a filter for removing the low-molecular mist is provided is not limited to the granulation system. The suction path may be provided in the polymerization reaction system.

Figure 2:
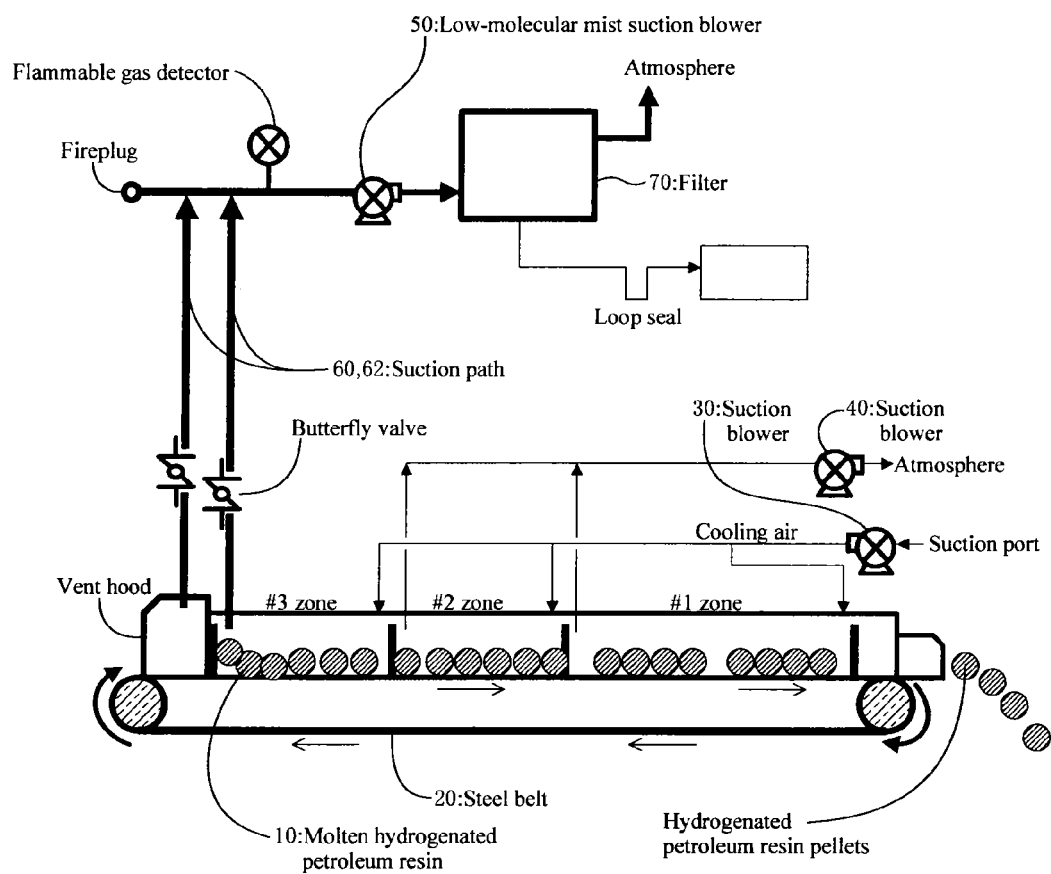
FIG. 2 is a view showing one embodiment of the method for producing a hydrogenated petroleum resin of the invention.

FIG. 2 is a view showing one embodiment of the method for producing a hydrogenated petroleum resin of the invention in which the granulator is a roll-drop type granulation apparatus.

A molten hydrogenated petroleum resin 10 is added dropwise from a porous cylinder of a granulator to a steel belt 20, and then solidified by cooling air supplied from a suction blower 30 at a #1 zone, a #2 zone and a #3 zone of the steel belt 20. The cooling air is sucked by a suction blower 40, and then discharged to the atmosphere from an exhaust port through an exhaust duct.

In FIG. 2, a low-molecular mist generated when the molten hydrogenated petroleum resin is added dropwise to the steel belt is sucked by a low-molecular mist suction blower 50 through suction paths 60 and 62 provided on the steel belt 20, and then introduced to a filter 70, where it is removed and collected.

In FIG. 2, two suction paths are provided. However, in the method for producing a hydrogenated petroleum resin of the invention, the number of the suction path is not particularly limited.

The low-molecular compound is a highly viscous fine particle such as an oligomer which is generated in the polymerization system, and has an average molecular weight of 100 to 300, for example.

The amount of the low-molecular mist generated in the granulation system is about 8 to 13 L a day per ton of the molten hydrogenated petroleum resin, for example. The properties of the low-molecular mist discharged from the exhaustion duct depend on the grade of the product resin. However, for example, the mist has a concentration of 60 to 300 mg/m$^3$, the mist grain diameter is 0.5 to 8 μm, the dynamic viscosity of a condensate is 56 to 209 mm$^2$/s and the density is 0.984 to 0.991 g/cm$^3$.

The suction range (the range where the suction path is provided) of the low-molecular mist by the suction path is preferably a range where the molten hydrogenated petroleum resin is not solidified. By evaluating the range where the resin is solidified in advance, a blower which has economically advantageous sucking performance and a filter which has an economical filtering area can be provided. Specifically, by measuring a temperature which is equal to or lower than the softening point of the hydrogenated resin (solidification temperature), the suction range can be evaluated.

In the meantime, as for solidification of the molten hydrogenated petroleum resin, it is confirmed by the following examples that, irrespective of the grade of the resin, the resin is solidified at an almost equal distance from the position at which the resin is added dropwise.

Examples of usable filters include an inertial impaction filter, an interrupt filter, an electrostatic adsorption filter and a Brownian diffusion filter or the like. A suitable filter is determined taking into consideration the differential pressure, the collection ratio, the lifetime and the cost.

Of the above-mentioned filters, in the case of an inertial impaction filter, an interrupt filter and an electrostatic adsorption filter, the collection performance by mass is lowered for a mist having a diameter of 10 μm or less. In particular, as for a mist having a diameter of 0.3 μm or less, collection according to mass is neglected, and almost no mist can be collected. On the other hand, a Brownian diffusion filter can collect a mist having a diameter of 0.3 μm or less. In particular, it can collect efficiently a mist having a diameter of 0.1 to 0.01 μm.

A low-molecular mist is composed of a fine, highly viscous fine particle having a mist diameter of 1 μm or less, and hence, is difficult to be caught by an inertial impaction filter.

In the invention, by using a glass fiber filter as a filter, in addition to the effect of inert impaction, an effect of collecting particles of which the mass is neglected (collection effect by Brownian diffusion) can be preferably obtained.

The pressure loss of the filter is set to 2 kPa or less, for example, to determine the filtration area of the filter.

In the collection of the highly viscous low-molecular mist, it is required to increase the filtration area by decreasing the pressure loss. The pressure loss is preferably 0.5 to 2.5 kPa.

EXAMPLES

Evaluation Example

[Selection of Filter]

Figure 3:
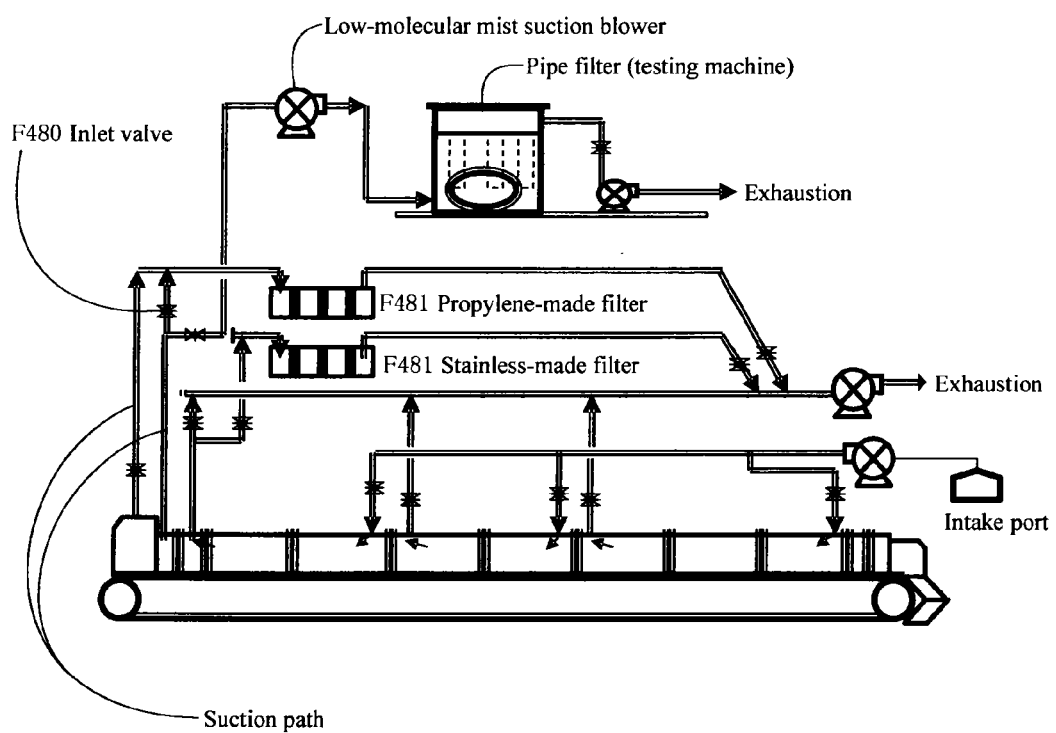
FIG. 3 is a schematic view of the apparatus used for selecting a filter.

A filter was selected by using an apparatus shown in FIG. 3. Specifically, in a filter of the pipe filter of the apparatus shown in FIG. 3, a glass fiber layer filter (a pipe filter manufactured by Izumi Environmental Engineering, Co., Ltd.) was incorporated in two stages, and removal of the low-molecular mist was conducted.

The amount of suction wind of the low-molecular suction blower was set such that the pressure loss of the filter became 2 kPa. The amount of suction wind of the low-molecular suction blower was set to 2.7 m$^3$/min based on the pressure loss of the test filter. Two suction paths were provided, i.e. the #3 zone and the vent hood of the granulator, and the amount of wind and the wind flow rate were adjusted by means of a butterfly valve.

In order to confirm the collection effect of the filter, an output port capable of measuring the concentration was provided at the inlet linear part and the filter exhaust line of the suction blower of the low-molecular mist compound. The measurement was conducted by the cylindrical paper filtering method (JIS Z 8808).

The collection effect was evaluated by measuring the mist concentration at the inlet and the outlet of the filter by the suction gas chromatography method. By confirming the behavior of the pressure loss, the lifetime was judged. The results of evaluation are shown in FIG. 4.

Filter selection was conducted in the winter where the suction temperature was low. The test was conducted for 1.5 months, and the collection ratio of almost 95% or more of the low-molecular mist could be confirmed. An increase in pressure loss (differential pressure) means that the filter is unable to use. In the evaluation example, an increase in differential pressure was caused by a change in concentration of the low-molecular compound due to the change in grade, and was in a permissible range. Accordingly, use of a glass fiber layer filter was determined.

In the cylindrical paper filtering method, the low-molecular mist is sucked to the filter paper from the four locations in the pipe, and the weight of the low-molecular mist was measured. The reason therefor is to eliminate the difference, since the flow rate differs according to the location in the pipe. In the above-mentioned suction gas chromatography method, the mist was sucked in a toluene solution, and the components were confirmed by the gas chromatograph to measure the weight.

Figure 4:
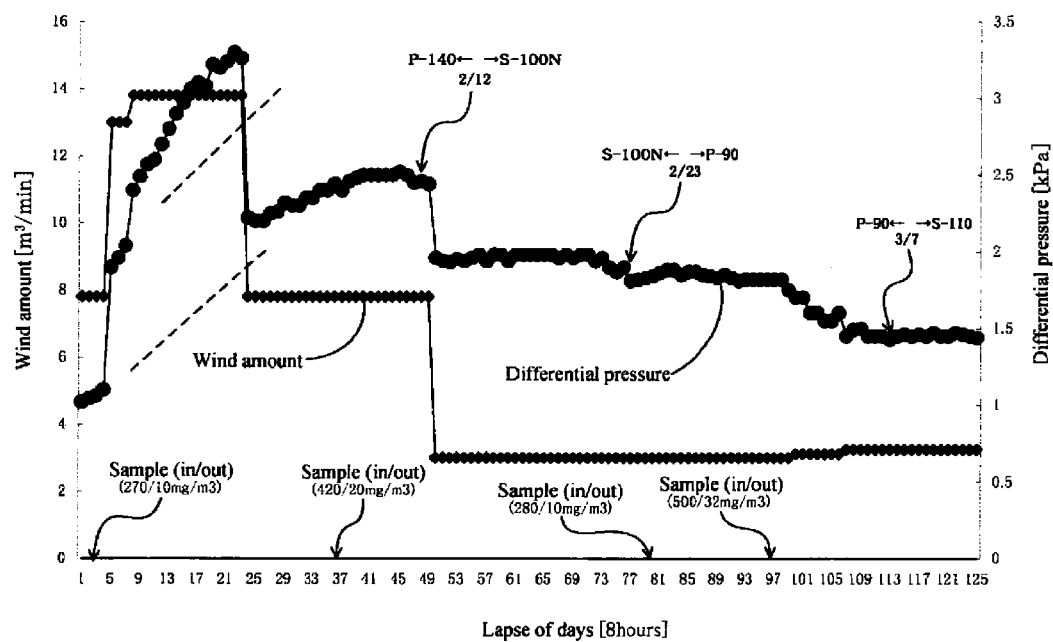
FIG. 4 is a view showing the results of filter selection.

In FIG. 4, as for the lapse of days on the transverse axis, one scale means 8 hours. The "P-140←→S-100N 2/12" at the 48$^{th}$ scale means that the sample was changed from P-140 to S-100N (both are hydrogenated petroleum resins, manufactured by Idemitsu Kosan Co. Ltd.). Both P-90 and S-110 were hydrogenated petroleum resins (manufactured by Idemitsu Kosan Co. Ltd.). Further, by the 21$^{st}$ scale on the lapsed days, the air flow was not specific (the air flow at which the pressure loss became about 2 KPa, and was about 2.7 m$^3$/min), but was maximum (about 14 m$^3$/min). The F480 inlet valve was squeezed by half to allow the amount of the mist to be supplied to the filter to increase.

In FIG. 4, the "sample (in/out) 270/10 mg/m$^3$" means that the inlet concentration was 270 mg/m$^3$ and the outlet concentration was 10 mg/m$^3$.

[Setting of Suction Range of Low-Molecular Mist]

Figure 5:
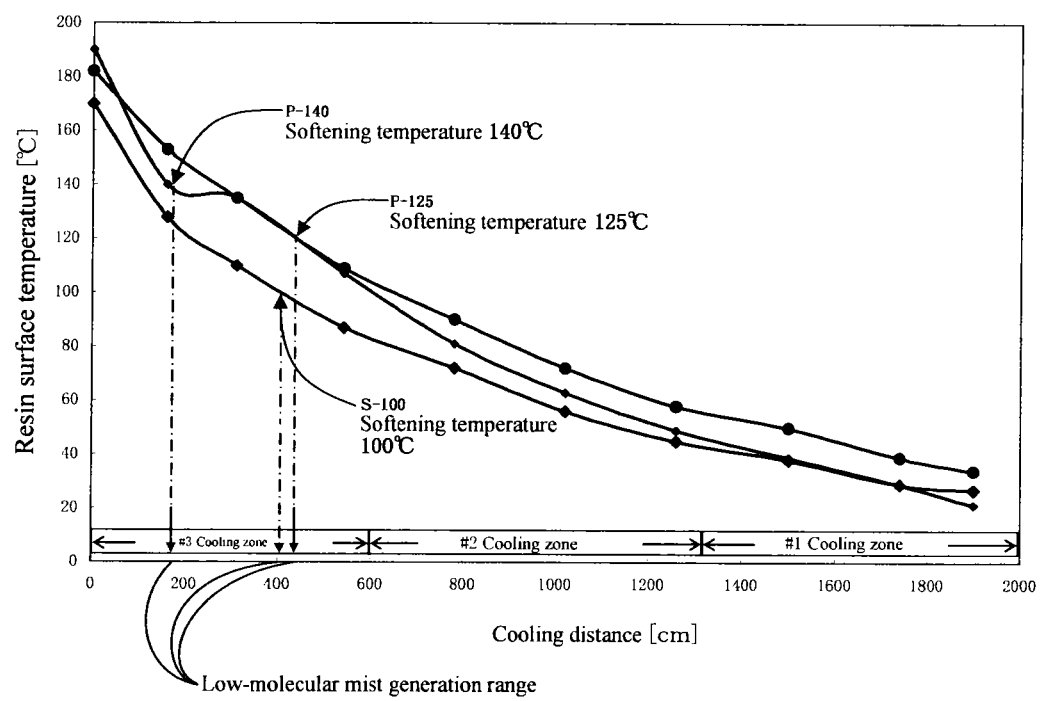
FIG. 5 is a view showing the results of evaluating the sucking region of a low-molecular mist.

By solidification of the molten resin, generation of the low-molecular mist stops. When the mist generation stops, the resin surface temperature is measured, thereby confirming the solidification temperature and the cooling distance. Specifically, in an apparatus shown in FIG. 2, by using the P-140 resin (hydrogenated petroleum resin, manufactured by Idemitsu Kosan, Co. Ltd.) having a softening point of 140° C., the P-125 resin (hydrogenated petroleum resin, manufactured by Idemitsu Kosan, Co. Ltd.) having a softening point of 125° C. and the S-100 resin (hydrogenated petroleum resin, manufactured by Idemitsu Kosan, Co. Ltd.) having a softening point of 100° C., when the amount charged in the granulation system was the maximum (at the time of maximum charging of the apparatus), the resin surface temperature was measured by means of a surface thermometer, and the distance between a point at which the resin was added dropwise to a point at which the resin temperature was lowered equal to or lower than the softening point was measured. The results are shown in FIG. 5.

It was confirmed that the molten resin was solidified irrespective of the resin grade if the type of the resin was the same.

Example 1

In an apparatus shown in FIG. 2, from the required amount of cooling air, the amount of suction gas of the low-molecular mist suction blower was set to 102 m$^3$/min and the filtration area of the filter was determined such that the pressure loss became 1.96 kPa or less. 20 filters each having 5 stages of the glass fiber layer were inserted to start operation.

The inlet and outlet concentrations of the pipe filter were measured by the cylindrical paper filtering method. As a result, it was found that the collection ratio of the low-molecular mist was 99.6% and the pressure loss was 1.2 kPa. The results are shown in Table 1.

Example 2

In an apparatus shown in FIG. 3, the collection ratio of the low-molecular mist was evaluated by changing the number of the suction path to one (one in the #3 zone) and using only three stages of the stainless-made inertial impaction filter. The results are shown in Table 1.

Example 3

The collection ratio of the low-molecular mist was evaluated in the same manner as in Example 2, except that the number of the suction path was changed to two (by sucking the gas also from the vent hood part of the granulator) and three stages of the inertial impaction which has a three-dimensional structure and is polypropylene filter were further used. The results are shown in Table 1.

TABLE 1

|  | Example 1 (Glass fiber layer: 5 stages) | Example 2 (Stainelss layer: 3 stages) | Example 3 (Stainelss layer: 3 stages + Propylene resin layer: 3 stages) |
| --- | --- | --- | --- |
| Collection ratio [%] | 99.6 | 56 | 73 |
| Pressure loss [kPa] | 1.2 | 0.98 | 0.95 |

INDUSTRIAL APPLICABILITY

By the method of producing a hydrogenated petroleum resin of the invention, it is possible to produce a hydrogenated petroleum resin which hardly causes environmental hazard.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A method for producing a hydrogenated petroleum resin, the method comprising:
   polymerizing a cyclopentadiene-based compound and an aromatic vinyl compound, thereby obtaining a polymer;
   hydrogenating the polymer to prepare a molten hydrogenated petroleum resin; and
   granulating the molten hydrogenated petroleum resin, thereby obtaining hydrogenated petroleum resin pellets,
   wherein the granulating comprises sucking a low-molecular mist generated from the molten hydrogenated petroleum resin through a suction path having a filter in a granulator, and removing the low-molecular mist with the filter.

2. The method of claim 1, wherein the filter is a glass fiber layer filter.

3. The method of claim 1,
   wherein the granulating comprises:
   adding the molten hydrogenated petroleum resin dropwise to a steel belt in the granulator providing the suction path at any position of the steel belt where the molten hydrogenated petroleum resin is not solidified and
   the granulator is a roll-drop granulator.

4. The method of claim 1, wherein the petroleum resin is a copolymer or a hydrogenated polymer.

5. The method of claim 1, wherein the cyclopentadiene-based compound is cyclopentadiene, methylcyclopentadiene, ethylcyclopentadiene, a dimer of cyclopentadiene, a dimer of methylcyclopentadiene, a dimer of ethylcyclopentadiene, a co-dimer of cyclopentadiene, a co-dimer of methylcyclopentadiene, or a co-dimer of ethylcyclopentadiene.

6. The method of claim 1, wherein the aromatic vinyl compound is styrene, α-methylstyrene, or vinyltoluene.

7. The method of claim 1, wherein the polymerizing is a thermal polymerization in a polymerization solvent comprising an aromatic-based solvent, a naphthene-based solvent, or an aliphatic hydrocarbon-based solvent.

8. The method of claim 7, wherein the polymerization solvent is benzene, toluene, xylene, cyclohexane, dimethylcyclohexane, or ethylcyclohexane.

9. The method of claim 7, wherein an amount of the polymerization solvent is 50 to 500 parts by mass of a monomer mixture.

10. The method of claim 7, wherein the thermal polymerization comprises heating at least at 100° C. at time of starting a polymerization reaction.

11. The method of claim 10, wherein a temperature of the polymerization reaction is from 150 to 350° C.

12. The method of claim 10, wherein a pressure of the polymerization reaction is from 0 to 2 MPa.

13. The method of claim 1, wherein the low-molecular mist comprises fine particles having an average molecular weight of 100 to 300.

14. The method of claim 1, wherein when removing the low-molecular mist with the filter pressure loss is 0.5 to 2.5 kPa.

15. The method of claim 1, wherein the filter is an inertial impaction filter, an interrupt filter, an electrostatic adsorption filter, a Brownian diffusion filter or a glass fiber filter.

16. The method of claim 5, wherein the aromatic vinyl compound is styrene, α-methylstyrene, or vinyltoluene.

* * * * *